United States Patent
Iwasaki

(10) Patent No.: US 11,489,841 B2
(45) Date of Patent: Nov. 1, 2022

(54) INFORMATION PROCESSING APPARATUS, INFORMATION PROCESSING SYSTEM, AND NON-TRANSITORY COMPUTER READABLE MEDIUM

(71) Applicant: FUJIFILM BUSINESS INNOVATION CORP., Tokyo (JP)

(72) Inventor: Manabu Iwasaki, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 17 days.

(21) Appl. No.: 16/833,745

(22) Filed: Mar. 30, 2020

(65) Prior Publication Data

US 2021/0092125 A1   Mar. 25, 2021

(30) Foreign Application Priority Data

Sep. 20, 2019 (JP) .............................. JP2019-171395

(51) Int. Cl.
  *G06F 15/16* (2006.01)
  *H04L 9/40* (2022.01)
  *H04L 51/52* (2022.01)

(52) U.S. Cl.
  CPC ............ *H04L 63/104* (2013.01); *H04L 51/52* (2022.05)

(58) Field of Classification Search
  CPC ............................... H04L 51/32; H04L 63/104
  See application file for complete search history.

(56) References Cited

U.S. PATENT DOCUMENTS

| | | | |
|---|---|---|---|
| 2003/0037110 A1* | 2/2003 | Yamamoto | H04L 51/20 709/204 |
| 2013/0198811 A1* | 8/2013 | Yu | G06Q 50/01 726/4 |
| 2016/0295501 A1* | 10/2016 | Choi | H04W 48/16 |
| 2017/0272445 A1* | 9/2017 | Kishida | G06F 3/1238 |
| 2017/0310617 A1* | 10/2017 | Wada | G06F 13/00 |
| 2019/0058684 A1* | 2/2019 | Morrison | H04W 4/08 |

FOREIGN PATENT DOCUMENTS

| | | |
|---|---|---|
| JP | 2004-206187 A | 7/2004 |
| JP | 2018-28754 A | 2/2018 |

* cited by examiner

*Primary Examiner* — Yves Dalencourt
(74) *Attorney, Agent, or Firm* — Oliff PLC

(57) ABSTRACT

An information processing apparatus includes a processor configured to, when a user posts information on a social networking service (SNS) that is related to a request for use of an apparatus, grant the user an authority to use the apparatus, the SNS being a service in which participants exchange information, the user being a participant of the SNS, the apparatus being a participant of the SNS and having a trust relationship with another participant who has a trust relationship with the user, trust relationships being relationships in which information is exchanged on the SNS only between limited participants.

15 Claims, 5 Drawing Sheets

FIG. 7

| DEDICATED APPARATUS | ADMINISTRATOR | NECESSITY OF ROOM ACCESS AUTHORITY | PRESENCE OF USAGE RESTRICTION | SECURITY CAMERA | RELATIONSHIP BETWEEN GROUPS |
|---|---|---|---|---|---|
| MULTIFUNCTION MACHINE OF COMPANY A | X | YES | NO | NO | — |
| PRINTER OF COMPANY B | Y | YES | YES | NO | AFFILIATED COMPANY OF COMPANY C |
| MULTIFUNCTION MACHINE OF COMPANY C | Z | YES | YES | YES | AFFILIATED COMPANY OF COMPANY B |
| ... | ... | ... | ... | ... | ... |

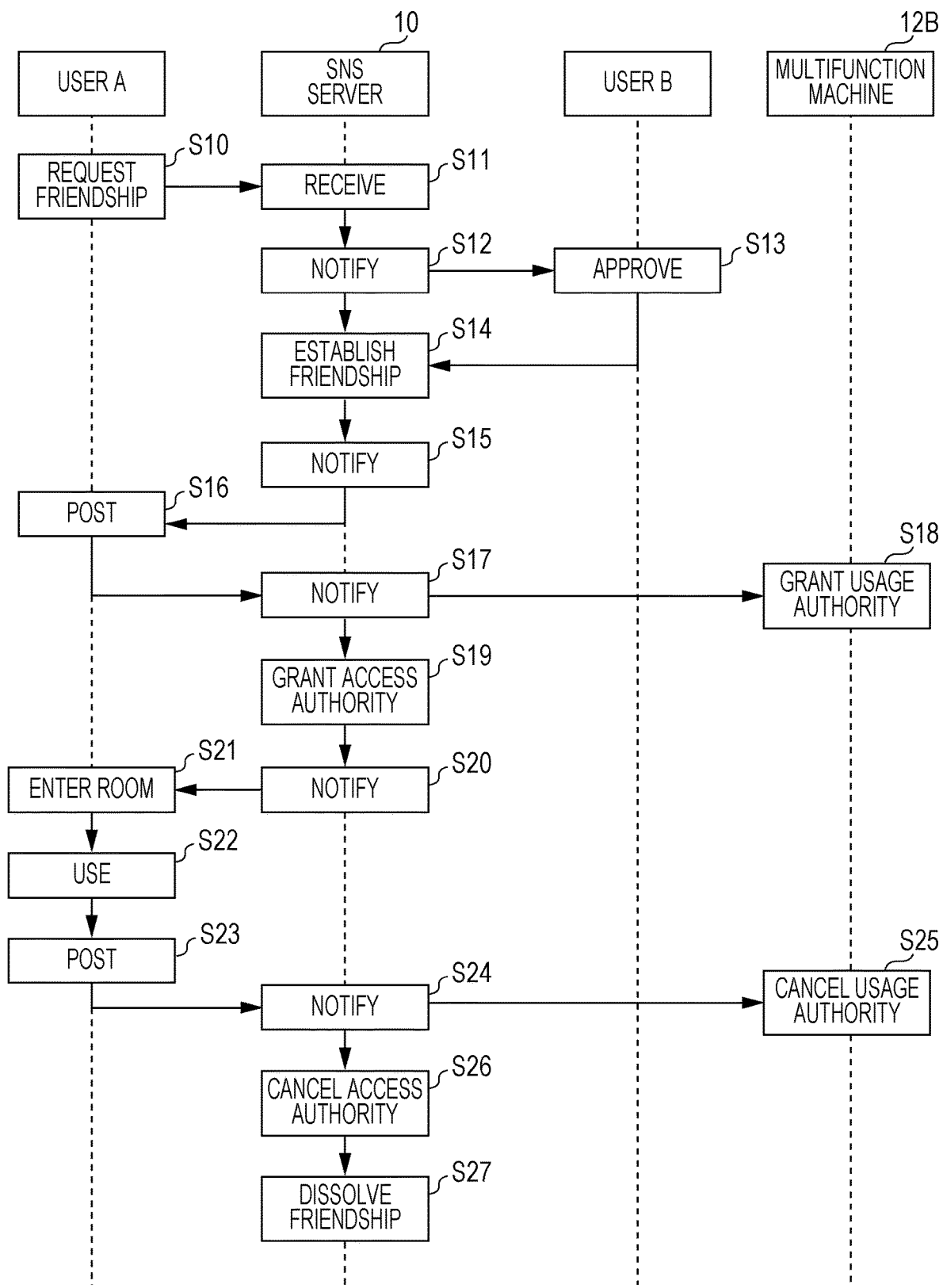

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-171395 filed Sep. 20, 2019.

BACKGROUND

(i) Technical Field

The present disclosure relates to an information processing apparatus, an information processing system, and a non-transitory computer readable medium.

(ii) Related Art

Japanese Unexamined Patent Application Publication No. 2004-206187 describes a system for use by a community of members sharing common hobbies or backgrounds. The system issues, in response to a request from a delegator member who has authority, a delegation certificate for delegation of authority to a delegatee member.

Japanese Unexamined Patent Application Publication No. 2018-028754 discloses a system described below. The system calculates, if a requesting user has no access authority to enter a room where a multifunction machine is installed, the duration of time for which to temporarily allow access to the room by the requesting user, and allows the requesting user to have access to the room for the calculated duration of time.

SUMMARY

Aspects of non-limiting embodiments of the present disclosure relate to providing a system for a person to lend an apparatus to another person with whom the person has a connection on a social networking service (to be referred to as "SNS" hereinafter).

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to, when a user posts information on a social networking service (SNS) that is related to a request for use of an apparatus, grant the user an authority to use the apparatus, the SNS being a service in which participants exchange information, the user being a participant of the SNS, the apparatus being a participant of the SNS and having a trust relationship with another participant who has a trust relationship with the user, trust relationships being relationships in which information is exchanged on the SNS only between limited participants.

BRIEF DESCRIPTION OF THE DRAWINGS

Exemplary embodiment of the present disclosure will be described in detail based on the following figures, wherein:

FIG. 7 illustrates a management table; and

FIG. 8 is a sequence diagram illustrating a process according to Example 1.

DETAILED DESCRIPTION

Figure 1:
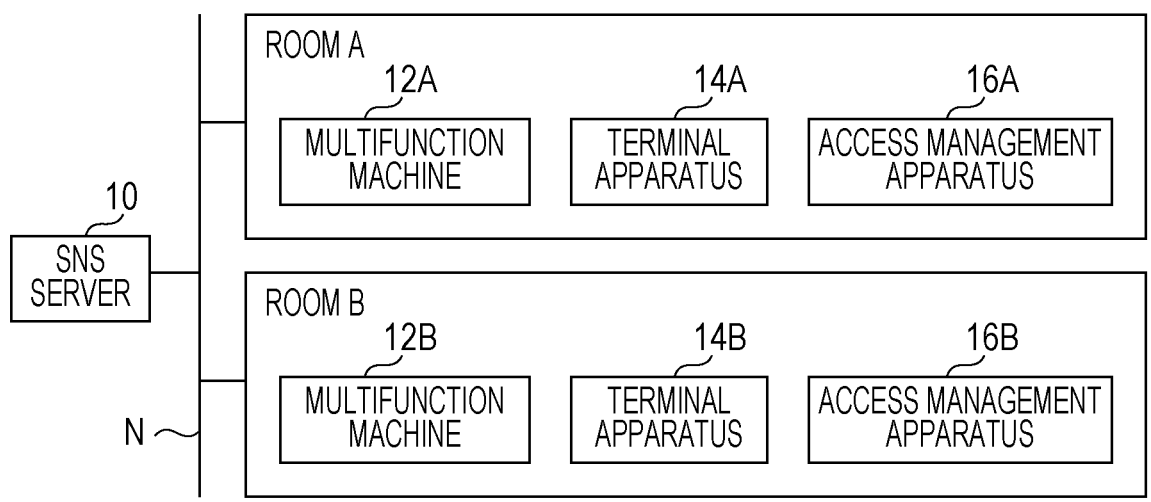
FIG. 1 is a block diagram illustrating the configuration of an information processing system according to an exemplary embodiment.

With reference to FIG. 1, an information processing system according to an exemplary embodiment will be described below. FIG. 1 illustrates an exemplary configuration of the information processing system according to the exemplary embodiment.

The information processing system according to the exemplary embodiment includes, for example, an SNS server 10, an apparatus installed in Room A, and an apparatus installed in Room B. The number of rooms depicted in FIG. 1 is only illustrative. The information processing system may include apparatuses installed in any other number of rooms. The information processing system may include another apparatus (e.g., an external server).

The SNS server 10 provides an SNS. An SNS is a service that supports or facilitates exchange of information between participants of the SNS to support or facilitate connections between a participant and another participant. There can also exist an SNS that does not allow participation by a person not invited by an existing participant. Examples of SNS include Facebook®, LINE®, Twitter®, and LinkedIN®.

Examples of information exchanged on an SNS include character string data such as messages or comments, image data, audio data, and combinations of these pieces of data.

The SNS server 10 stores and manages account information of each participant of an SNS and the relationship between participants. A participant is, for example, a member registered with the SNS. Account information is used for logging into the SNS to use the SNS. Account information includes, for example, a participant ID and a password for the SNS. For example, when a participant having account information sends the account information to the SNS server 10 and logs into the SNS, the participant is allowed to use the SNS. Examples of information indicating the relationship between participants include information indicating the strength of trust between participants on the SNS, information indicating the kind of relationship between participants (e.g., friends), and information indicating both of these pieces of information.

Room A is a room intended for use only by one or more Users A belonging to User Group A. An electronic lock is installed at the entrance (e.g., a door or gate) to Room A. User A has the access authority to enter Room A, and is thus allowed to enter Room A.

For example, the electronic lock of Room A is associated with user identification information used to identify a user who has the access authority for Room A. When it is herein stated that user identification information is associated with an electronic lock, this means that the user identification information is stored in the storage device of the electronic lock, or that information for identifying the electronic lock and the user identification information are stored in a server or other apparatus in association with each other. Examples of user identification information include a user ID, a name, and SNS account information. For example, the user identification information of a user is stored on an ID card or terminal apparatus used by the user. The user identification information stored on an ID card or terminal apparatus is read by a reader provided to the electronic lock of Room A. If the user identification information thus read is associated with the electronic lock, the electronic lock is unlocked. If the user identification information thus read is not associated with the electronic lock, the electronic lock is not unlocked. Of course, the access authority for Room A may be managed by another method. For example, an ID card or terminal apparatus may store unlock authority information used to unlock the electronic lock of Room A, and the electronic lock may be unlocked upon entry of the unlock authority information into the electronic lock of Room A.

One or more dedicated apparatuses are installed in Room A. A dedicated apparatus installed in Room A is an apparatus managed by User Group A and intended for use only by User A. User A has the usage authority to use a dedicated apparatus installed in Room A, and is thus allowed to use the dedicated apparatus.

For example, a dedicated apparatus installed in Room A is associated with user identification information used to identify a user who has the usage authority for the dedicated apparatus. When it is herein stated that user identification information is associated with a dedicated apparatus, this means that the user identification information is stored in the storage device of the dedicated apparatus, or that information for identifying the dedicated apparatus and the user identification information are stored in a server or other apparatus in association with each other. For example, user identification information stored on an ID card or terminal apparatus used by a user is read by a reader provided to a dedicated apparatus installed in Room A. If the user identification information thus read is associated with the dedicated apparatus installed in Room A, the user is allowed to use the dedicated apparatus. If the user identification information thus read is not associated with the dedicated apparatus, the user is not allowed to use the dedicated apparatus. Of course, usage authority may be managed by another method. For example, an ID card or terminal apparatus may store usage authority information necessary for using a dedicated apparatus installed in Room A, and if a user enters the usage authority information into the dedicated apparatus, the user may be allowed to use the dedicated apparatus.

In the example depicted in FIG. 1, a multifunction machine 12A, which is an example of a dedicated apparatus, is installed in Room A. The multifunction machine 12A, which corresponds to an example of an image processing apparatus, is an apparatus having at least one of scan, print, copy, and facsimile functions. Plural multifunction machines 12A may be installed in Room A. The multifunction machine 12A is only one illustrative example of a dedicated apparatus. An apparatus other than the multifunction machine 12A may be installed in Room A.

A terminal apparatus 14A is an apparatus used by User A. Examples of the terminal apparatus 14A include a personal computer (to be referred to as "PC" hereinafter), a tablet PC, a smart phone, and a cellular phone. For example, User A may operate the terminal apparatus 14A to log into an SNS and use the SNS.

An access management apparatus 16A manages the entering and leaving of a person into and from Room A. If user identification information read from an ID card or terminal apparatus is associated with the electronic lock of Room A, the access management apparatus 16A unlocks the electronic lock. If the user identification information thus read is not associated with the electronic lock, the access management apparatus 16A does not unlock the electronic lock. In another example, the access management apparatus 16A may unlock the electronic lock if unlock authority information is read from an ID card or terminal apparatus.

Room B is a room intended for use only by one or more Users B belonging to User Group B. An electronic lock is installed at the entrance (e.g., a door or gate) to Room B. User B has the access authority to enter Room B, and is thus allowed to enter Room B.

For example, the electronic lock of Room B is associated with user identification information used to identify a user who has the access authority for Room B. Such user identification information stored on an ID card or terminal apparatus is read by a reader provided to the electronic lock of Room B. If the user identification information thus read is associated with the electronic lock, the electronic lock is unlocked. If the user identification information thus read is not associated with the electronic lock, the electronic lock is not unlocked. Of course, the access authority for Room B may be managed by another method. For example, an ID card or terminal apparatus may store unlock authority information necessary for unlocking the electronic lock of Room B, and the electronic lock may be unlocked upon entry of the unlock authority information into the electronic lock of Room B.

One or more dedicated apparatuses are installed in Room B. A dedicated apparatus installed in Room B is an apparatus managed by User Group B and intended for use only by User B. User B has the usage authority to use a dedicated apparatus installed in Room B, and is thus allowed to use the dedicated apparatus.

For example, a dedicated apparatus installed in Room B is associated with user identification information used to identify a user who has the usage authority for the dedicated apparatus. For example, user identification information stored on an ID card or terminal apparatus used by a user is read by a reader provided to a dedicated apparatus installed in Room B. If the user identification information thus read is associated with the dedicated apparatus installed in Room B, the user is allowed to use the dedicated apparatus. If the user identification information thus read is not associated with the dedicated apparatus, the user is not allowed to use the dedicated apparatus. Of course, usage authority may be managed by another method. For example, an ID card or terminal apparatus may store usage authority information necessary for using a dedicated apparatus installed in Room B, and if a user enters the usage authority information into the dedicated apparatus, the user may be allowed to use the dedicated apparatus.

In the example illustrated in FIG. 1, a multifunction machine 12B, which is an example of a dedicated apparatus, is installed in Room B. The multifunction machine 12B, which corresponds to an example of an image processing apparatus, is an apparatus having at least one of scan, print, copy, and facsimile functions. Plural multifunction machines 12B may be installed in Room B. The multifunction machine 12B is only one illustrative example of a dedicated apparatus. An apparatus other than the multifunction machine 12B may be installed in Room B.

A terminal apparatus 14B is an apparatus used by User B. Examples of the terminal apparatus 14B include a PC, a tablet PC, a smart phone, and a cellular phone. For example, User B may operate the terminal apparatus 14B to log into an SNS and use the SNS.

An access management apparatus 16B manages the entering and leaving of a person into and from Room B. If user identification information read from an ID card or terminal apparatus is associated with the electronic lock of Room B, the access management apparatus 16B unlocks the electronic lock. If the user identification information thus read is not associated with the electronic lock, the access management apparatus 16B does not unlock the electronic lock. In another example, the access management apparatus 16B may unlock the electronic lock if unlock authority information is read from an ID card or terminal apparatus.

The information processing system according to the exemplary embodiment is used in, for example, a shared office used by plural users. User Groups A and B represent companies that are tenants of the shared office. For example, User Groups A and B are different companies, and Users A and B are employees or other persons belonging to different companies. User A and a dedicated apparatus that belong to User Group A, and User B and a dedicated apparatus that belong to User Group B are managed by different companies.

User Groups A and B may be different departments belonging to the same company. In other words, Users A and B may be employees or other persons who belong to the same company but belong to different departments.

Of course, each of User Groups A and B may not be, for example, a company, or a department belonging to a company but may be an organization or grouping other than a company or department.

A dedicated apparatus may be an apparatus other than a multifunction machine. For example, a dedicated apparatus belonging to User Group A, and a dedicated apparatus belonging to User Group B may be apparatuses that differ in hardware configuration, function, or performance. A display such as a projector may be used as the dedicated apparatus.

The SNS server 10, the multifunction machines 12A and 12B, the terminal apparatuses 14A and 14B, and the access management apparatus 16A and 16B may each have a function to communicate with another apparatus. The communication may be performed via wired communication using a cable, or via wireless communication. In other words, each apparatus and, for example, another apparatus may be physically connected via a cable to transmit and receive information to and from each other, or may transmit and receive information to and from each other via wireless communication. As wireless communication, for example, short-range wireless communication or Wi-Fi® may be used. Alternatively, wireless communication standards other than these standards may be used. Examples of short-range wireless communication include Bluetooth®, radio frequency identifier (RFID), and near-field communication (NFC). Each apparatus may communicate with another apparatus via a communication channel such as a local area network (LAN) or the Internet.

For example, Room A has a LAN built therein that can be used in Room A. The multifunction machine 12A, the terminal apparatus 14A, and the access management apparatus 16A are each capable of communicating with another apparatus belonging to User Group A via the LAN.

Likewise, Room B has a LAN built therein that can be used in Room B. The multifunction machine 12B, the terminal apparatus 14B, and the access management apparatus 16B are each capable of communicating with another apparatus belonging to User Group B via the LAN.

The SNS server 10, the multifunction machines 12A and 12B, and the terminal apparatuses 14A and 14B can each use a communication channel N to communicate with another apparatus via the communication channel N. The communication channel N is, for example, the Internet.

For example, the account information of each of Users A and B is stored in and managed by the SNS server 10. In other words, Users A and B are participants of an SNS provided by the SNS server 10 who are registered with the SNS.

The account information of each of the multifunction machines 12A and 12B is stored in and managed by the SNS server 10. In other words, the multifunction machines 12A and 12B are participants of an SNS provided by the SNS server 10 who are registered with the SNS. For example, a chatbot associated with the multifunction machine 12A participates in the SNS as the multifunction machine 12A, and exchanges information on the SNS. The same applies to the multifunction machine 12B. The chatbot may be implemented by artificial intelligence.

In the exemplary embodiment, an SNS is used by a person to lend a dedicated apparatus to another person with whom the person has a connection on the SNS. For example, User A has no usage authority for a dedicated apparatus installed in Room B, and is thus not allowed to use the dedicated apparatus installed in Room B. User B has no usage authority for a dedicated apparatus installed in Room A, and is thus not allowed to use the dedicated apparatus installed in Room A. When User A is granted the usage authority for a dedicated apparatus installed in Room B, User A is allowed to use the dedicated apparatus installed in Room B. The same applies to User B. The granting of usage authority is performed on the SNS.

A dedicated apparatus itself may be an example of an information processing apparatus, or the SNS server 10 may be an example of an information processing apparatus.

Figure 2:
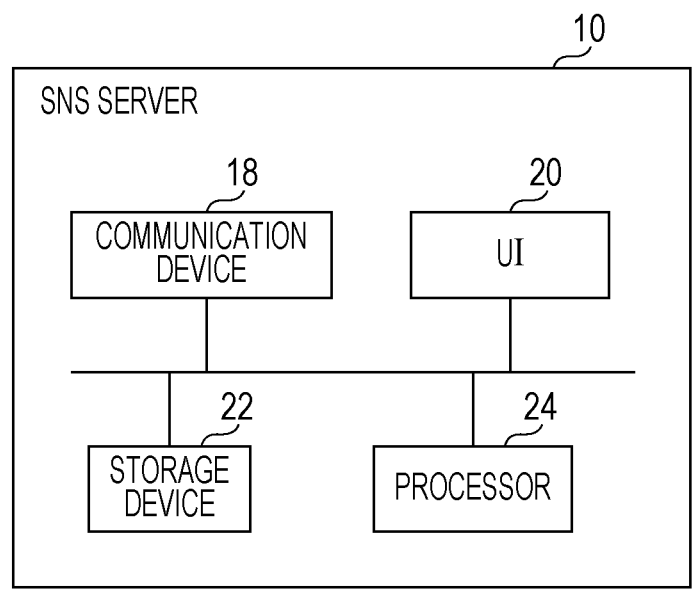
FIG. 2 is a block diagram illustrating the configuration of an SNS server according to the exemplary embodiment.

The hardware configuration of the SNS server 10 will be described below with reference to FIG. 2. FIG. 2 illustrates an exemplary hardware configuration of the SNS server 10.

The SNS server 10 includes, for example, a communication device 18, a UI 20, a storage device 22, and a processor 24.

The communication device 18 is a communication interface. The communication device 18 has the function of transmitting information to another device, and the function of receiving information transmitted from another device. The communication device 18 may have a wireless communication function or a wired communication function. The communication device 18 may communicate with another device by means of, for example, short-range wireless communication, or may communicate with another device via a communication channel such as a LAN or the Internet.

The UI 20 is a user interface, and includes a display and an operating device. The display is, for example, a liquid crystal display or an EL display. The operating device is, for example, a keyboard, an input key, or an operation panel. The UI 20 may be, for example, a touch screen including both a display and an operating device. The UI 20 may include a microphone, or the UI 20 may include a speaker that generates sound. The SNS server 10 may not include the UI 20.

The storage device 22 is a device including one or more storage areas for storing various information. Examples of the storage device 22 include hard disk drives, various memories (e.g., a RAM, a DRAM, and a ROM), other storage devices (e.g., an optical disc), and combinations thereof. The SNS server 10 includes one or more storage devices 22.

The processor 24 controls operation of various units of the SNS server 10. For example, the processor 24 may communicate with various devices by using the communication device 18, display information on the display of the UI 20, receive information input via the UI 20, store information into the storage device 22, or read information from the storage device 22. The processor 24 may include a memory.

The processor 24 may manage the usage authority for a dedicated apparatus. For example, the processor 24 executes a process such as granting the usage authority for a dedicated apparatus to be lent, to a user who has no usage authority for the dedicated apparatus, or cancelling the usage authority previously granted to the user. When the usage authority for a dedicated apparatus is granted to a user, the user is allowed to use the dedicated apparatus. When the usage authority for a dedicated apparatus previously granted to a user is cancelled, the user is not allowed to use the dedicated apparatus.

The processor 24 may manage the access authority for a room. For example, the processor 24 executes a process such as granting the access authority for a room to a user who has no access authority for the room, or cancelling the access authority previously granted to the user. When the access authority for a room is granted to a user, the user is allowed to enter the room. When the access authority for a room previously granted to a user is cancelled, the user is not allowed to enter the room.

Figure 3:
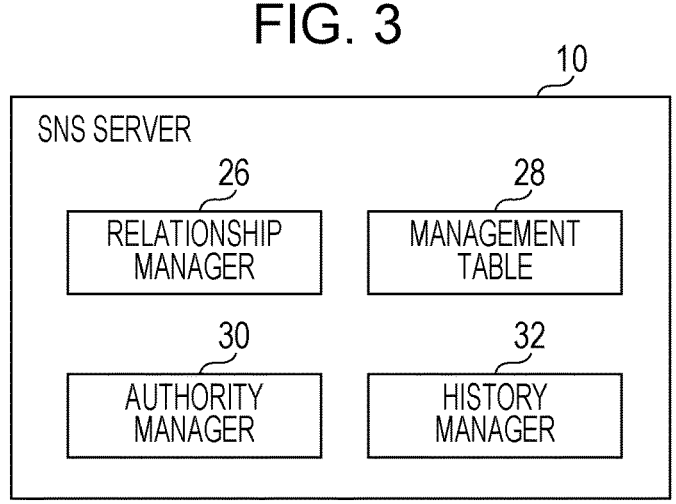
FIG. 3 is a block diagram illustrating the configuration of the SNS server according to the exemplary embodiment.

The functional configuration of the SNS server 10 will be described below with reference to FIG. 3. FIG. 3 illustrates an exemplary functional configuration of the SNS server 10. The components illustrated in FIG. 3 are implemented by the processor 24.

A relationship manager 26 manages a relationship between participants on an SNS. Information indicating the relationship is stored into the storage device 22. The relationship manager 26 creates a relationship between participants, or dissolves the created relationship.

For example, the relationship manager 26 manages a trust relationship between participants. A trust relationship, which reflects the strength of connection or trust between participants, is a relationship in which information is exchanged on an SNS only between limited participants. In one example, when a participant and another participant approve each other on an SNS, a trust relationship is created between the participant and the other participant. In another example, a participant may request another participant for creation of a trust relationship, and if the other participant approves, the trust relationship may be created between the participant and the other participant. A trust relationship may be created between plural participants in accordance with an instruction of a participant having the authority to create a trust relationship.

Once a trust relationship is created between participants, information posted on an SNS by a participant is sent to another participant who has a trust relationship with this participant.

For example, when a participant posts information on an SNS to a display area dedicated to the account information of the participant, the posted information is sent to another participant who has a trust relationship with this participant. Likewise, when the other participant posts information to a display area dedicated to the account information of the other participant, the posted information is sent to the above-mentioned participant.

A display area dedicated to the account information of a participant refers to a display area on an SNS assigned to the account information of the participant. The participant, and another participant having a trust relationship with this participant are allowed to post to the display area. A participant and another participant on an SNS are allowed to access, on the SNS, a display area dedicated to the account information of the participant, and view information posted on the display area. For example, if a participant accesses the display area, information posted on the display area is displayed on the UI of the participant's terminal apparatus. Of course, other participants may be disallowed to view the posted information. A participant having a trust relationship with another participant is allowed to post on an SNS to a display area dedicated to the account information of the other participant. In other words, a participant is allowed to post to a display area dedicated to another participant who has a trust relationship with the participant. Of course, a participant may make a setting to disallow another participant other than himself or herself to post to a display area dedicated to the account information of the participant.

A management table 28 is used to manage information such as whether the access authority to enter a room is necessary, or whether there is any restriction on the use of a dedicated apparatus. The data of the management table 28 is stored in the storage device 22. For example, information indicating whether the access authority to enter a room is necessary, information indicating whether there is any restriction on the use of a dedicated apparatus, or other information is sent to the SNS server 10 in advance and registered into the management table 28.

An authority manager 30 manages, for example, the access authority for a room, or the usage authority for a dedicated apparatus. For example, the authority manager 30 may grant the access authority for a room to a user who has no access authority for the room, or cancels the access authority previously granted to the user. The authority manager 30 may grant the usage authority for a dedicated apparatus to a user who has no usage authority for the dedicated apparatus, or cancel the usage authority previously granted to the user.

Modes of granting of access authority and usage authority may include provisional granting and definitive granting. Provisional granting means granting a user an access authority and a usage authority that are not valid. Definitive granting means setting valid the access authority and the access authority that have been granted to the user. In this sense, provisional granting can be also said to be a reservation for room access and apparatus use. Of course, instead of using modes of granting such as provisional granting and definitive granting, an access authority and a usage authority that are set valid may be granted to the user.

Management of the usage authority for a dedicated apparatus, and management of the access authority for a room where the dedicated apparatus is installed may be performed by the dedicated apparatus.

A history manager 32 manages the history of posts made on an SNS. For example, for each individual participant, the history manager 32 manages the history of information posted on an SNS by the participant. History information indicating the history is stored into the storage device 22.

Figure 4:
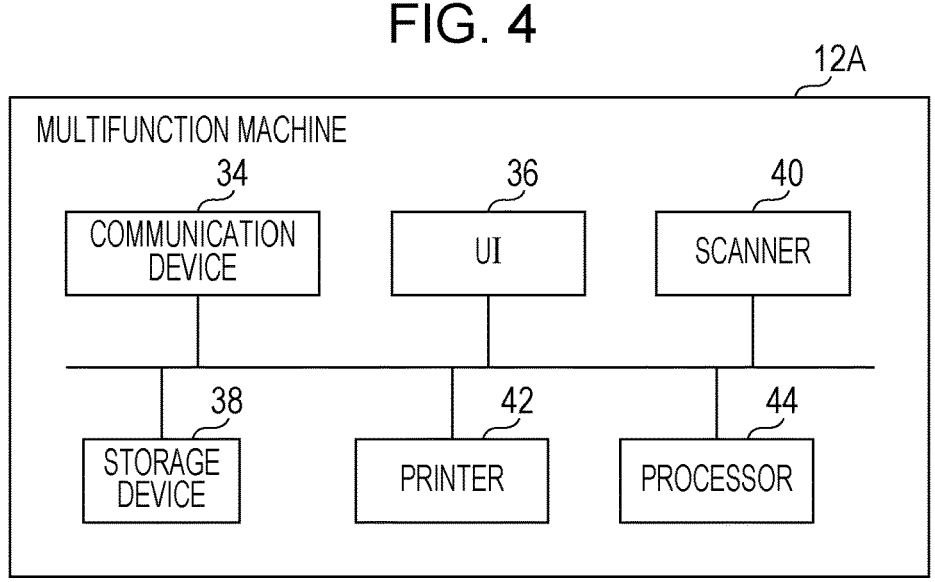
FIG. 4 is a block diagram illustrating the configuration of a multifunction machine according to the exemplary embodiment.

The hardware configuration of each of the multifunction machines 12A and 12B will be described below with reference to FIG. 4. FIG. 4 illustrates an exemplary hardware configuration of the multifunction machine 12A. The multifunction machine 12B may have a hardware configuration identical to the hardware configuration of the multifunction machine 12A, or may have a hardware configuration that partially differs from the hardware configuration of the multifunction machine 12A. The multifunction machines 12A and 12B may be identical to each other in performance and functionality, or may be different from each other in performance and functionality.

The multifunction machine 12A includes, for example, a communication device 34, a UI 36, a storage device 38, a scanner 40, a printer 42, and a processor 44.

The communication device 34 is a communication interface. The communication device 34 has the function of transmitting information to another device, and the function of receiving information transmitted from another device. The communication device 34 may have a wireless communication function or a wired communication function. The communication device 34 may communicate with another device by means of, for example, short-range wireless communication, or may communicate with another device via a communication channel such as a LAN or the Internet.

The UI 36 is a user interface, and includes a display and an operating device. The display is, for example, a liquid crystal display or an EL display. The operating device is, for example, a keyboard, an input key, or an operation panel. The UI 36 may be, for example, a touch screen including both a display and an operating device. The UI 36 may include a microphone, or the UI 36 may include a speaker that generates sound.

The storage device 38 includes one or more storage areas for storing various information. Examples of the storage device 38 include hard disk drives, various memories (e.g., a RAM, a DRAM, and a ROM), other storage devices (e.g., an optical disc), and combinations thereof. The multifunction machine 12A includes one or more storage devices 38.

The scanner 40 optically reads a document to generate image data representing the document.

The printer 42 prints, on a sheet of paper, image data to be printed.

The multifunction machine 12A may include both the scanner 40 and the printer 42, or may include one of the scanner 40 and the printer 42. The same applies to the multifunction machine 12B.

The processor 44 controls operation of various units of the multifunction machine 12A. For example, the processor 44 may control scanning performed by the scanner 40, or may control printing performed by the printer 42. The processor 44 may control copying implemented by using the scanner 40 and the printer 42. The processor 44 may communicate with various devices by using the communication device 34, display information on the display of the UI 36, receive information input via the UI 36, store information into the storage device 38, or read information from the storage device 38. The processor 44 may have a memory.

The processor 44 may manage the usage authority for the multifunction machine 12A. For example, the processor 44 may execute a process such as granting the usage authority for the multifunction machine 12A to a user who has no usage authority for the multifunction machine 12A, or cancelling the usage authority previously granted to the user. When the usage authority for the multifunction machine 12A is granted to a user, the user is allowed to use the multifunction machine 12A. When the usage authority for the multifunction machine 12A previously granted to a user is cancelled, the user is not allowed to use the multifunction machine 12A.

The processor 44 may manage the access authority for Room A where the multifunction machine 12A is installed. For example, the processor 44 may execute a process such as granting the access authority for Room A where the multifunction machine 12A is installed, to a user who has no access authority for Room A, or cancelling the access authority previously granted to the user.

The multifunction machines 12A and 12B may include a post-processing device such as a stapler or bookbinding machinery.

Figure 5:
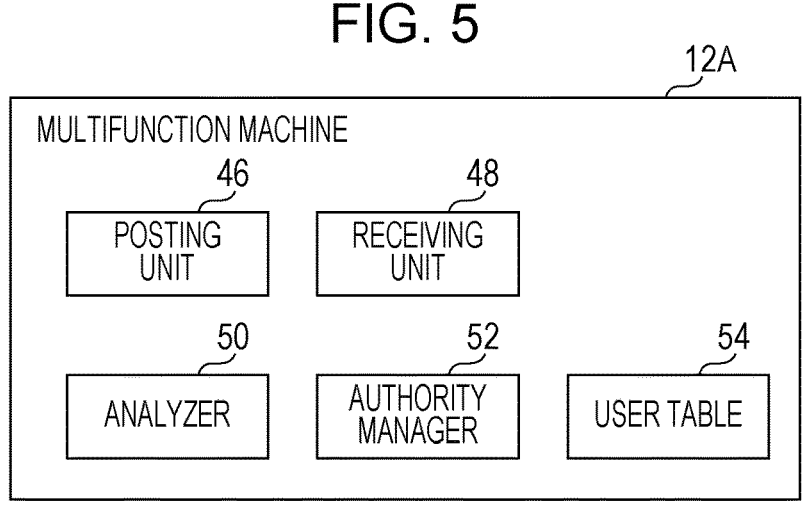
FIG. 5 is a block diagram illustrating the functional configuration of the multifunction machine according to the exemplary embodiment.

The functional configuration of the multifunction machine 12A will be described below with reference to FIG. 5. FIG. 5 illustrates an exemplary functional configuration of the multifunction machine 12A. The components illustrated in FIG. 5 are implemented by the processor 44. The multifunction machine 12B also has the components illustrated in FIG. 5.

A posting unit 46 posts information such as a message on an SNS as information associated with the multifunction machine 12A. For example, the posting unit 46 may post information to a display area dedicated to the account information of the multifunction machine 12A, or may post information to a display area dedicated to the account information of another participant having a trust relationship with the multifunction machine 12A.

A receiving unit 48 receives a notification sent on an SNS to the multifunction machine 12A.

An analyzer 50 analyzes information posted on an SNS to the multifunction machine 12A. For example, the analyzer 50 analyzes information posted to a display area dedicated to the account information of the multifunction machine 12A. Analysis of posted information may be performed by an external server. The external server may be the SNS server 10, or may be a server other than the SNS server 10. In this case, information indicating the analysis results is transmitted from the external server to the multifunction machine 12A.

An authority manager 52 manages the usage authority for the multifunction machine 12A. For example, based on the results of analysis by the analyzer 50, the authority manager 52 grants the usage authority for the multifunction machine 12A to a user who has no usage authority for the multifunction machine 12A, or cancels the usage authority previously granted to the user. A usage authority may be granted on the provisional basis or definitive basis mentioned above. Of course, instead of using modes of granting such as provisional granting and definitive granting, a usage authority that is set valid may be granted to the user. The authority manager 52 may manage the access authority for Room A where the multifunction machine 12A is installed.

A user table 54 is used to manage which user has the usage authority for the multifunction machine 12A. The data of the user table 54 is stored in the storage device 38. For example, user identification information for identifying which user has the usage authority for the multifunction machine 12A is registered in the user table 54.

The terminal apparatuses 14A and 14B, and the access management apparatuses 16A and 16B also include a communication device, an UI, a storage device, and a processor.

Figure 6:
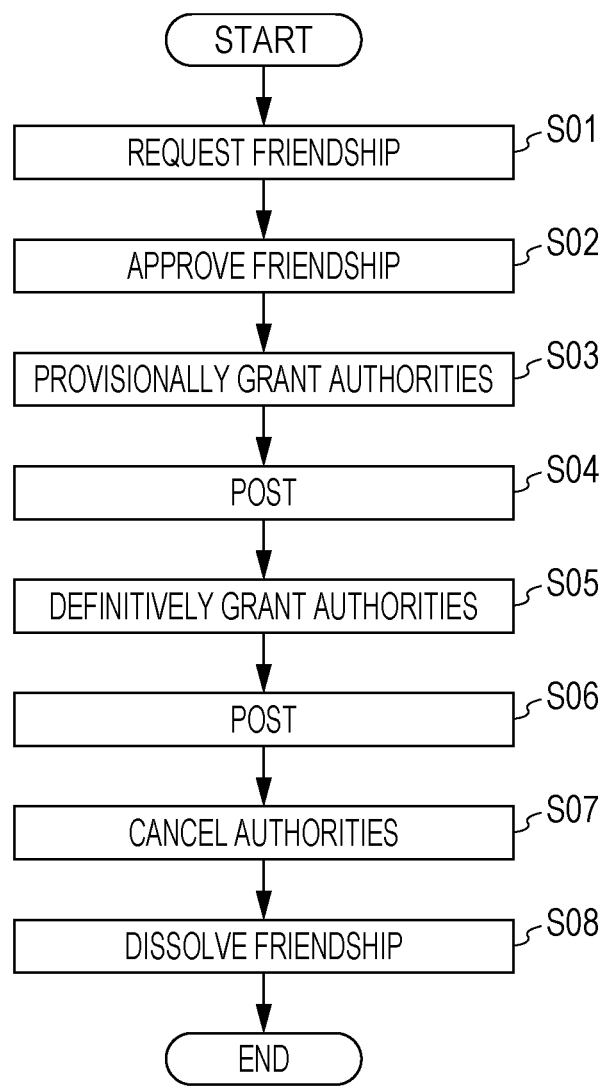
FIG. 6 is a flowchart schematically illustrating a process according to the exemplary embodiment.

A process performed by the information processing system according to the exemplary embodiment will be described below with reference to FIG. 6. FIG. 6 is a flowchart schematically illustrating the process.

On an SNS, a trust relationship between participants is built by an approval action. In the exemplary embodiment, such an approval action is used to grant another person the access authority for a room or the usage authority for a dedicated apparatus.

In the following, for a participant of an SNS, another participant of the SNS who has a trust relationship with the participant will be referred to as "friend" of the participant. The participant is also a "friend" of the other participant.

The following description assumes an example in which User A wants to use the multifunction machine 12B belonging to User Group B. User A, User B, and the multifunction machine 12B have been registered with the SNS as participants, and have logged into the SNS. User A has logged into the SNS via the terminal apparatus 14A, and User B has logged into the SNS via the terminal apparatus 14B. On the SNS, a trust relationship has been created between User A and User B, and a trust relationship has been created between User B and the multifunction machine 12B. In other words, User A and User B are friends on the SNS, and User B and the multifunction machine 12B are friends on the SNS. This means that the multifunction machine 12B is a friend of User B who is a friend of User A. In other words, for each of User A and the multifunction machine 12B, the other is a friend of the friend User B.

On an SNS, a participant is able to search for friends of a friend of the participant. For example, when User A searches for friends of User B on an SNS, the multifunction machine 12B is found as a friend of User B. Information representing the multifunction machine 12B thus found is displayed on the terminal apparatus 14A of User A. If the multifunction machine 12B is not a friend of User B, the multifunction machine 12B is not found.

When the multifunction machine 12B is found as a friend of User B, User A operates the terminal apparatus 14A to request the multifunction machine 12B on the SNS that User A and the multifunction machine 12B become friends on the SNS (S01). For example, User A posts a message on the SNS indicating such a friend request and addressed to the multifunction machine 12B. The message indicating the friend request is sent to the multifunction machine 12B via the SNS server 10.

Notification of the friend request made from User A to the multifunction machine 12B is provided to User B, who is a friend of the multifunction machine 12B. The notification may be provided by the SNS server 10 or may be provided by the multifunction machine 12B.

If User B who has received the notification approves that User A and the multifunction machine 12B become friends (S02), the access authority for Room B and the usage authority for the multifunction machine 12B are provisionally granted to User A (S03). The granting at this time is provisional, meaning that User A is not yet able to enter Room B and use the multifunction machine 12B.

If User B approves on the SNS that User A and the multifunction machine 12B become friends, a trust relationship is created between User A and the multifunction machine 12B, and User A and the multifunction machine 12B become friends. Thus, User A is now allowed to post on the SNS to a display area dedicated to the account information of the multifunction machine 12B. For example, User A is now allowed to post to the timeline (e.g., a display area that displays a post made by the multifunction machine 12B itself and where a friend of the multifunction machine 12B is allowed to post) of the multifunction machine 12B on Facebook.

When User A posts a message on the SNS to the display area dedicated to the account information of the multifunction machine 12B, indicating that User A intends to use the multifunction machine 12B (S04), the access authority for Room B and the usage authority for the multifunction machine 12B are granted to User A (S05). The granting at this time is definitive, meaning that User A is now able to enter Room B and use the multifunction machine 12B.

For example, the access authority for Room B and the usage authority for the multifunction machine 12B become associated with the ID card or terminal apparatus 14A of User A. In other words, user identification information stored on the ID card or terminal apparatus 14A of User A become associated with the electronic lock of Room B and with the multifunction machine 12B.

Alternatively, user identification information stored on the ID card or terminal apparatus 14A of User A may become associated with the electronic lock of Room B and with the multifunction machine 12B at the time of provisional granting. In this case, the user identification information is associated with the electronic lock of Room B and with the multifunction machine 12B as invalid user identification information. At this point, even when a reader provided to the electronic lock of Room B reads the user identification information from the ID card or terminal apparatus 14A of User A, the electronic lock is not unlocked. Likewise, at this point, even when a reader provided to the multifunction machine 12B reads the user identification information from the ID card or terminal apparatus 14A of User A, User A is not allowed to use the multifunction machine 12B.

Based on the access authority now associated with the ID card or terminal apparatus 14A of User A, User A is able to unlock the electronic lock of Room B and enter Room B. Further, based on the usage authority now associated with the ID card or terminal apparatus 14A of User A, User A is able to use the multifunction machine 12B.

User B can view information posted on the SNS to a display area dedicated to the account information of the multifunction machine 12B. For example, the message posted by User A at S04 is displayed on the display area. By viewing the message, User B can recognize the contents of the message.

When User A posts a message on the SNS to the display area dedicated to the account information of the multifunction machine 12B, indicating that User A has finished using the multifunction machine 12B (S06), the access authority for Room B and the usage authority for the multifunction machine 12B are cancelled (S07). As a result, the status of granting of access authority and usage authority to User A returns to provisional granting. For example, the association between the user identification information of User A and the electronic lock of Room B is cancelled, and likewise, the association between the user identification information of User A and the multifunction machine 12B is cancelled. In other words, the user identification information of User A becomes unassociated with the electronic lock of Room B and with the multifunction machine 12B. Thus, entry into Room B and use of the multifunction machine 12B are now disallowed for User A. In another example, when a predetermined amount of time elapses from the time when the access authority for Room B and the usage authority for the multifunction machine 12B are granted to a user at S05, the access authority and the usage authority may be cancelled.

At the point when the access authority and the usage authority are cancelled at S07, User A and the multifunction machine 12B are friends. Accordingly, by performing the operation of S04, User A is granted the access authority for Room B and the usage authority for the multifunction machine 12B (S05). The granting at this time is definitive granting. In this case, User A is able to enter Room B and use the multifunction machine 12B.

When a predetermined amount of time elapses from the time when the access authority for Room B and the usage authority for the multifunction machine 12B are cancelled, the friendship between User A and the multifunction machine 12B is dissolved, and thus User A and the multifunction machine 12B cease to be friends on the SNS (S08). As a result, the authorities previously granted to User A, that is, the access authority for Room B and the usage authority for the multifunction machine 12B, are completely cancelled. This means that the provisional granting is also cancelled. In order for User A to obtain the access authority for Room B and the usage authority for the multifunction machine 12B, User A has to start over from S01 at which User A requests the multifunction machine 12B to be friends with User A.

In another example, the friendship between User A and the multifunction machine 12B may be dissolved when a predetermined amount of time elapses from the time when User A and the multifunction machine 12B become friends or the time when the access authority for Room B and the usage authority for the multifunction machine 12B are definitively granted to User A (i.e., the time corresponding to S05). In still another example, the friendship between User A and the multifunction machine 12B may be dissolved when User B who has approved a friend request from User A posts a message on the SNS indicating that the friendship between User A and the multifunction machine 12B is to be dissolved.

If, with User A and the multifunction machine 12B being friends, User A posts a message to a display area dedicated to the account information of the multifunction machine 12B, inquiring the current status of the multifunction machine 12B (e.g., usage status or whether a failure has occurred), the multifunction machine 12B may post a message to the display area that indicates the current status of the multifunction machine 12B.

The contents of the posts mentioned above are managed on the SNS server 10 as history information. For example, information posted to a display area (e.g., timeline) dedicated to the account information of the multifunction machine 12B is managed on the SNS server 10 as history information for the display area.

A specific example of the management table 28 will be described below with reference to FIG. 7. FIG. 7 illustrates an example of the management table 28.

The management table 28 associates, for example, the following pieces of information with each other: dedicated-apparatus identification information for identifying a dedicated apparatus registered with an SNS; administrator identification information for identifying an administrator who manages the dedicated apparatus; information indicating the necessity of the access authority to enter a room where the dedicated apparatus is installed; information indicating the presence of any restriction on the use of the dedicated apparatus; information indicating the presence of any security camera installed in the room; and information indicating the relationship between user groups. These pieces of information are transmitted to the SNS server 10 in advance and managed on the SNS server 10.

For example, a multifunction machine of Company A, a printer of Company B, a multifunction machine of Company C, and Administrators X, Y, and Z are registered with an SNS, and associated with account information necessary for using the SNS. Each of Company A, Company B, and Company C is an example of a user group.

The multifunction machine of Company A is managed by Administrator X, who is a user belonging to Company A. Administrator X is an employee of Company A. Administrator X and the multifunction machine of Company A are friends on the SNS.

The printer of Company B is managed by Administrator Y, who is a user belonging to Company B. Administrator Y is an employee of Company B. Administrator Y and the printer of Company B are friends on the SNS.

The multifunction machine of Company C is managed by Administrator Z, who is a user belonging to Company C. Administrator Z is an employee of Company C. Administrator Z and the multifunction machine of Company C are friends on the SNS.

The room where the multifunction machine of Company A is installed has an electronic lock. An access authority is necessary for entry into the room. The same applies to the printer of Company B and the multifunction machine of Company C.

Although no usage authority is set for the multifunction machine of Company A, a usage authority is set for each of the printer of Company B and the multifunction machine of Company C. Accordingly, although no usage authority is necessary to use the multifunction machine of Company A, a usage authority is necessary to use the printer of Company B and the multifunction machine of Company C.

Although the room where the multifunction machine of Company A is installed and the room where the printer of Company B is installed have no installed security camera, the room where the multifunction machine of Company C is installed has an installed security camera. In Company C, when the security camera captures an image of a suspicious person (e.g., a person who is not an employee of Company C), a suspicious-person alarm is sounded.

Company B and Company C are affiliated companies. Thus, an employee of Company B, who is a user belonging to Company B, is allowed to enter Company C. For example, an employee of Company B has the access authority for a room where the multifunction machine of Company C is installed.

For example, Employee P of Company A is registered with an SNS, and is a friend of Administrator C on the SNS. If Employee P of Company A wants to use a multifunction machine of Company C, Employee P sends a request on the SNS to the multifunction machine of Company C, requesting that Employee P and the multifunction machine of Company C become friends on the SNS. When the multifunction machine of Company C receives the request, Administrator Z, which is a friend of the multifunction machine of Company C, is notified of the receipt of the request by the multifunction machine of Company C. When Administrator Z approves the request, Employee P and the multifunction machine of Company C become friends on the SNS. Thus, the access authority for Company C and the usage authority for the multifunction machine of Company C are granted to Employee P. At this time, Employee P is also granted the authority to temporarily disable the sounding of the suspicious-person alarm for Employee P. The granting of these authorities is provisional granting. For example, the access authority for Company C, the usage authority for the multifunction machine of Company C, and the authority to disable the suspicious-person alarm are granted for the ID card of Employee P. If, with Employee P and the multifunction machine of Company C being already friends on the SNS, Employee P posts a message on the SNS addressed to the multifunction machine of Company C, indicating that Employee P intends to use the multifunction machine of Company C, then the authorities provisionally granted to Employee P, that is, the access authority, the usage authority, and the authority to disable the suspicious-person alarm, are set valid. As a result, Employee P is now allowed to enter Company C based on the access authority, and use the multifunction machine of Company C based on the usage authority. In this case, the suspicious-person alarm is not sounded even when the security camera of Company C captures an image of Employee P.

In another example, Employee Q of Company B is registered with an SNS, and is a friend of Administrator C on the SNS. If Employee Q of Company B wants to use a multifunction machine of Company C, Employee Q sends a request on the SNS to the multifunction machine of Company C, requesting that Employee Q and the multifunction machine of Company C become friends on the SNS. When the multifunction machine of Company C receives the request, Administrator Z, which is a friend of the multifunction machine of Company C, is notified of the receipt of the request by the multifunction machine of Company C. When Administrator Z approves the request, Employee Q and the multifunction machine of Company C become friends on the SNS. Thus, the usage authority for the multifunction machine of Company C, and the authority to disable the suspicious-person alarm are granted to Employee Q. The granting at this time is provisional granting. Since Company B and Company C are affiliated companies, and Employee Q of Company B has the access authority for Company C in the first place, no access authority for Company C is granted to Employee Q again at this time. If, with Employee Q and the multifunction machine of Company C being already friends on the SNS, Employee Q posts a message on the SNS addressed to the multifunction machine of Company C, indicating that Employee Q intends to use the multifunction machine of Company C, then the authorities provisionally granted to Employee Q, that is, the usage authority and the authority to disable the suspicious-person alarm, are set valid. As a result, Employee Q is now allowed to use the multifunction machine of Company C based on the usage authority. At this time, the suspicious-person alarm is not sounded even when the security camera of Company C captures an image of Employee Q.

Specific examples of the exemplary embodiment will be described below.

Example 1

A process according to Example 1 will be described below with reference to FIG. 8. FIG. 8 is a sequence diagram illustrating the process according to Example 1.

The following description assumes an example in which User A wants to use the multifunction machine 12B. Further, User A and User B are friends on an SNS, and User B and the multifunction machine 12B are friends on the SNS.

First, User A operates the terminal apparatus 14A to search the SNS for the multifunction machine 12B who is a friend of User B.

When the multifunction machine 12B is found as a friend of User B, User A operates the terminal apparatus 14A to request the multifunction machine 12B on the SNS that User A and the multifunction machine 12B become friends on the SNS (S10). This request corresponds to a reservation for use of the multifunction machine 12B. For example, User A posts a message on the SNS indicating a friend request and addressed to the multifunction machine 12B. The message indicating a friend request is transmitted from the terminal apparatus 14A to the SNS server 10.

The SNS server 10 receives the message indicating a friend request (S11). This means that the SNS server 10 has received a request for reservation to use the multifunction machine 12B.

Then, notification of the friend request made from User A to the multifunction machine 12B is provided to User B, who is a friend of the multifunction machine 12B (S12). The notification may be provided by the SNS server 10 or may be provided by the multifunction machine 12B. For example, the SNS server 10 posts a message on the SNS addressed to User B, indicating that the multifunction machine 12B has received a message indicating a friend request from User A. Alternatively, the multifunction machine 12B may post a message on the SNS addressed to User B, indicating that the multifunction machine 12B has received a message indicating a friend request from User A. The posted message addressed to User B is sent to terminal apparatus 14B of User B. The posted message addressed to User B is then displayed on the display of the UI of the terminal apparatus 14B.

Next, User B determines whether to approve that User A and the multifunction machine 12B become friends. In other words, User B determines whether to grant User A the usage authority for the multifunction machine 12B.

When User B operates the terminal apparatus 14B to approve that User A and the multifunction machine 12B become friends (S13), a message indicating the approval is transmitted from the terminal apparatus 14B to the SNS server 10.

When the relationship manager 26 of the SNS server 10 receives, from the terminal apparatus 14B, a message approving that User A and the multifunction machine 12B become friends, the relationship manager 26 creates a trust relationship between User A and the multifunction machine 12B to thereby establish a friendship between User A and the multifunction machine 12B (S14). As a result, User A and the multifunction machine 12B become friends on the SNS. User A is thus allowed to post on the SNS to a display area dedicated to the account information of the multifunction machine 12B (e.g., the timeline of the multifunction machine 12B).

If User B does not approve that User A and the multifunction machine 12B become friends, the steps from S14 onwards are not executed.

When User A and the multifunction machine 12B become friends, the authority manager 30 of the SNS server 10 notifies User A of a message indicating that the friend request has been approved (S15). Upon this notification, the access authority for Room B and the usage authority for the multifunction machine 12B are provisionally granted to User A. This provisional granting serves as a reservation for use of the multifunction machine 12B. At this point, User A is still unable to enter Room B and use the multifunction machine 12B.

Alternatively, a message may be sent to the multifunction machine 12B that indicates the approval of the friend request by User B, and the authority manager 52 of the multifunction machine 12B may notify User A of the message.

Next, when User A posts a message on the SNS to the display area (e.g., timeline) dedicated to the account information of the multifunction machine 12B, indicating that User A intends to use the multifunction machine 12B (S16), the multifunction machine 12B receives notification of the message via the SNS server 10 (S17).

The analyzer 50 of the multifunction machine 12B analyzes the message indicating the intention to use the multifunction machine 12B. Based on the results of the analysis, the authority manager 52 of the multifunction machine 12B grants the usage authority for the multifunction machine 12B to User A (S18). The granting at this time is definitive granting. For example, the authority manager 52 registers the user identification information of User A into the user table 54 of the multifunction machine 12B. This associates the user identification information of User A with the multifunction machine 12B, thus allowing User A to use the multifunction machine 12B.

A function that User A is allowed to use on the multifunction machine 12B may be set. For example, when User A posts, at S16, a message addressed to the multifunction machine 12B that indicates which function User A plans to use, the authority manager 52 grants the usage authority for the function to User A. This is explained below by way of a specific example. When User A posts a message addressed to the multifunction machine 12B, indicating that User A intends to use the facsimile function of the multifunction machine 12B, the usage authority for the facsimile function is granted to User A. In this case, User A is allowed to use the facsimile function on the multifunction machine 12B but not allowed to use other functions.

The authority manager 30 of the SNS server 10 grants User A the access authority for Room B (S19). For example, the authority manager 30 associates the user identification information of User A with the electronic lock of Room B.

The authority manager 30 of the SNS server 10 may grant the access authority for Room B and the usage authority for the multifunction machine 12B to User A, or the authority manager 52 of the multifunction machine 12B may grant the access authority for Room B and the usage authority for the multifunction machine 12B to User A.

On the SNS, the SNS server 10 notifies User A of a message indicating that the access authority for Room B and the usage authority for the multifunction machine 12B have been definitively granted to User A (S20).

When User A passes his or her own ID card or terminal apparatus 14A over a reader of the electronic lock of Room B, the reader reads the user identification information of User A from the ID card or terminal apparatus 14A. Since the user identification information of User A is already associated with the electronic lock of Room B, the access management apparatus 16B of Room B unlocks the electronic lock of Room B. User A is thus able to enter Room B.

User A enters Room B (S21), and uses the multifunction machine 12B (S22). When User A passes his or her own ID card or terminal apparatus 14A over a reader of the multifunction machine 12B, the reader reads the user identification information of User A from the ID card or terminal apparatus 14A. Since the user identification information of User A is already registered in the user table 54 of the multifunction machine 12B, and the user identification information of User A is already associated with the multifunction machine 12B, User A is allowed to use the multifunction machine 12B. User A is thus able to use the multifunction machine 12B. For example, User A is able to log into the multifunction machine 12B by using the user identification information of User A, and use the multifunction machine 12B.

When User A posts a message on the SNS to the display area (e.g., timeline) dedicated to the account information of the multifunction machine 12B, indicating that User A has finished using the multifunction machine 12B (S23), the multifunction machine 12B receives notification of the message via the SNS server 10 (S24).

The analyzer 50 of the multifunction machine 12B analyzes the message indicating that User A has finished using the multifunction machine 12B. Based on the results of the analysis, the authority manager 52 of the multifunction machine 12B cancels the usage authority for the multifunction machine 12B previously granted to User A (S25). For example, the authority manager 52 removes the user identification information of User A from the user table 54 of the multifunction machine 12B, or sets the user identification information of User A as invalid user identification information in the user table 54. As a result, the association between the user identification information of User A and the multifunction machine 12B is cancelled, and User A is no longer allowed to use the multifunction machine 12B.

The authority manager 30 of the SNS server 10 cancels the association between the user identification information of User A and the electronic lock of Room B to thereby cancel the access authority for Room B previously granted to User A (S26).

When the access authority for Room B and the usage authority for the multifunction machine 12B are cancelled, the status of granting of access authority and usage authority to User A returns to provisional granting. At this point, User A and the multifunction machine 12B are friends.

In one example, when a predetermined amount of time elapses from the time when the access authority for Room B and the usage authority for the multifunction machine 12B are granted to a user, the access authority and the usage authority may be cancelled.

The relationship manager 26 of the SNS server 10 dissolves the friendship between User A and the multifunction machine 12B when a predetermined amount of time elapses from one of the following points in time: when the access authority for Room B and the usage authority for the multifunction machine 12B are cancelled; when User A and the multifunction machine 12B become friends; and when the access authority for Room B and the usage authority for the multifunction machine 12B are definitively granted to User A (S27). User A and the multifunction machine 12B thus cease to be friends. If User A wants to use the multifunction machine 12B again, User A has to start over from the step of requesting the multifunction machine 12B to be friends with User A.

In one example, the access authority for Room B previously granted to User A may be cancelled when the electronic lock of Room B is unlocked by using the user identification information of User A. For example, when the electronic lock of Room B is unlocked by using the user identification information of User A, the access management apparatus 16B transmits information to the SNS server 10 indicating that the electronic lock of Room B has been unlocked by using the user identification information of User A. Then, the authority manager 30 of the SNS server 10 cancels the access authority for Room B previously granted to User A. In other words, the authority manager 30 cancels the association between the user identification information of User A and the electronic lock of Room B. As a result, once User A leaves Room B, User A is no longer able to unlock the electronic lock of Room B by using the user identification information of User A. In order for User A to unlock the electronic lock of Room B, User A needs to ask the multifunction machine 12B, which is a friend on the SNS, for re-entry into Room B. Specifically, as with S16, when User A posts a message on the SNS to the display area (e.g., timeline) dedicated to the account information of the multifunction machine 12B, indicating that User A intends to use the multifunction machine 12B, the user identification information of User A and the electronic lock of Room B become associated with each other again, and the access authority for Room B is granted to User A again. User A is thus able to unlock the electronic lock of Room B by using the user identification information of User A. For example, there may be a case where, after entering Room B, User A realizes that he or she has forgotten to bring something, and leaves Room B. There may be also a case where, after using the multifunction machine 12B and then leaving Room B, User A realizes that he or she has forgotten to remove a document from the multifunction machine 12B and thus needs to enter Room B again. In such cases, User A is able to enter Room B again by performing the same operation as S16, without making a friend request to the multifunction machine 12B. When the electronic lock of Room B is unlocked again by using the user identification information of User A, the access authority for Room B granted to User A is cancelled as described above.

In one example, when User A finishes using the multifunction machine 12B, the authority manager 52 of the multifunction machine 12B may cancel the association between the user identification information of User A and the multifunction machine 12B to thereby cancel the usage authority for the multifunction machine 12B previously granted to User A.

The history manager 32 of the SNS server 10 stores, into the storage device 22, history information including information such as a message posted on an SNS by each participant. For example, information such as a message posted to the display area (e.g., timeline) dedicated to the account information of the multifunction machine 12B is included in history information and stored into the storage device 22. For example, the following pieces of information are included in history information: information indicating the time at which User A has posted a friend request message; information indicating the time at which User A has posted a message indicating that User A intends to use the multifunction machine 12B; and information indicating the time at which User A has posted a message indicative of User A finishing the use of the multifunction machine 12B. The access management apparatus 16B also manages the time at which User A has entered Room B, and the time at which User A has left Room B, and stores information indicating these times as history information. By viewing such history information, User B may determine whether User A has used the multifunction machine 12B properly.

A restriction may be set for the usage authority granted to User A to use the multifunction machine 12B. Examples of such a restriction set for the usage authority granted to User A include how many sheets User A is allowed to use for the multifunction machine 12B, what function User A is allowed to use on the multifunction machine 12B, how long User A is allowed to use the multifunction machine 12B, and how many times User A is allowed to use the multifunction machine 12B. User B who has received a friend request may specify such a restriction on usage authority. For example, if User B sets the maximum number of sheets that can be copied to 100, User A is allowed to copy up to 100 sheets on the multifunction machine 12B. This prevents unrestricted use of the multifunction machine 12B by User A.

Example 2

A process according to Example 2 will be described below. As with Example 1, the following description assumes that User A wants to use the multifunction machine 12B, User A and User B are friends on an SNS, and User B and the multifunction machine 12B are friends on the SNS.

Example 2 assumes the following situation. First, User B creates a group to which plural participants including User A, User B, and the multifunction machine 12B belong. Subsequently, User A posts a message within the created group that is related to a request for use of the multifunction machine 12B. If User B approves the use of the multifunction machine 12B, then the authority manager 52 of the multifunction machine 12B grants User A the usage authority for the multifunction machine 12B. Further, the authority manager 30 of the SNS server 10 grants User A the access authority for Room B. One of the authority manager 30 of the SNS server 10 and the authority manager 52 of the multifunction machine 12B may grant User A both the access authority for Room B and the usage authority for the multifunction machine 12B.

The above-mentioned group is a group in which only plural participants belonging to the group exchange information such as a message. Information posted within the group is sent to a participant belonging to the group but not to another SNS participant who does not belong to the group. For example, a group chat is created that allows only participants belonging to the group to chat with each other.

For example, when User B operates the terminal apparatus 14B to instruct that a group chat including User A, User B, and the multifunction machine 12B be created, the relationship manager 26 of the SNS server 10 creates the group chat. This enables exchange of messages only among User A, User B, and the multifunction machine 12B. User A and the multifunction machine 12B may become friends when the group chat is created.

When the group chat is created, and User A then operates the terminal apparatus 14A to post a message in the group chat that requests the use of the multifunction machine 12B, the message is sent to User B and the multifunction machine 12B.

User B receives the message requesting the use of the multifunction machine 12B. When User B then operates the terminal apparatus 14B to post a message in the group chat indicating that User B allows User A to use the multifunction machine 12B, the message is sent to the multifunction machine 12B. Upon receiving the message from User B, the analyzer 50 of the multifunction machine 12B analyzes the respective messages posted by User A and User B. Based on the results of the analysis, the authority manager 52 of the multifunction machine 12B grants the access authority for Room B and the usage authority for the multifunction machine 12B to User A who has posted the message requesting the use of the multifunction machine 12B. The authority manager 30 of the SNS server 10 may the grant access authority and the usage authority to User A. The granting at this time is definitive granting. User A is now able to enter Room B and use the multifunction machine 12B.

After finishing the use of the multifunction machine 12B, User A operates the terminal apparatus 14A to post a message in the group chat indicating that User A has finished the use of the multifunction machine 12B. The message is sent to the multifunction machine 12B. Upon receiving the message, the multifunction machine 12B leaves the group chat. Thus, the access authority and the usage authority previously granted to User A are cancelled. In another example, the multifunction machine 12B may leave the group chat when User A finishes the use of the multifunction machine 12B. The group chat itself may end.

In another example, after a group chat is created, User A may operate the terminal apparatus 14A to post a message in the group chat indicating information about a process (e.g., print job) to be executed on the multifunction machine 12B. For example, User A posts a print job in the group chat that contains image data to be printed and information indicative of print settings. Then, the print job is sent to User B and the multifunction machine 12B. By viewing the print job, User B may determine whether to allow User A to use the multifunction machine 12B. When User B operates the terminal apparatus 14B to post a message in the group chat indicating that User B allows User A to use the multifunction machine 12B, the authority manager 52 of the multifunction machine 12B grants User A the access authority for Room B, and the usage authority to use the print function on the multifunction machine 12B in accordance with the print job posted by User A. User A is thus able to execute, on the multifunction machine 12B, the print job posted by User A. When the print job posted by User A is executed on the multifunction machine 12B, the multifunction machine 12B leaves the group chat. Thus, the access authority and the usage authority previously granted to User A are cancelled.

The history manager 32 of the SNS server 10 stores, into the storage device 22, history information including information such as a message posted in a group chat. User B is able to view information such as a message posted in the group chat created by User B himself or herself.

In the embodiment above, the term "processor" refers to hardware in a broad sense. Examples of the processor includes general processors (e.g., CPU: Central Processing Unit), and dedicated processors (e.g., GPU: Graphics Processing Unit, ASIC: Application Specific Integrated Circuit, FPGA: Field Programmable Gate Array, and programmable logic apparatus). In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising
a processor configured to:
receive a request for authorization to use a dedicated apparatus from a first user, the first user posting the request for authorization on a social networking service (SNS) addressed to the dedicated apparatus;
determine whether the first user has a trust relationship with a second user different from the first user and whether the second user has a trust relationship with the dedicated apparatus; and
grant the first user authorization to use the dedicated apparatus when the determination is that the first user has a trust relationship with the second user and the second user has a trust relationship with the dedicated apparatus,
wherein the processor grants the first user the authority to use the dedicated apparatus when, on the SNS, the first user requests use of the dedicated apparatus, and the second user approves the use,
wherein a trust relationship between the first user and the dedicated apparatus is created when the first user posts, information related to a request for creation of the trust relationship between the first user and the dedicated apparatus, and the second user approves the creation of the trust relationship between the user and the dedicated apparatus, and
wherein the processor grants the first user the authority to use the dedicated apparatus when the first user posts information related to a request for use of the dedicated apparatus to the dedicated apparatus on the SNS after the trust relationship between the first user and the apparatus is created.

2. The information processing apparatus according to claim 1,
wherein a participant having a trust relationship with the apparatus is allowed to post on the SNS to a display area dedicated to account information of the SNS of the dedicated apparatus, and the processor grants the first user the authority to use the dedicated apparatus when the first user posts information to the display area that is related to a request for use of the dedicated apparatus after the trust relationship between the first user and the dedicated apparatus is created.

3. The information processing apparatus according to claim 2,
wherein the processor also grants the first user an authority to enter a room in which the apparatus is installed when the processor grants the first user the authority to use the dedicated apparatus.

4. The information processing apparatus according to claim 3,
wherein after the authority to enter the room is cancelled, the processor grants the first user the authority to enter the room when the first user posts information related to a request for entering the room to the dedicated apparatus on the SNS and the trust relationship between the first user and the dedicated apparatus exists.

5. The information processing apparatus according to claim 1,
wherein the processor grants the first user the authority to use the dedicated apparatus, after the second user creates a group, when the first user posts information within the group that is related to a request for use of the dedicated apparatus, and the second user approves the use, the group being a group to which a plurality of participants belong and in which information is exchanged only between the plurality of participants, the plurality of participants including the first user, the second user, and the dedicated apparatus.

6. The information processing apparatus according to claim 5,
wherein the processor also grants the first user an authority to enter a room in which the apparatus is installed when the processor grants the first user the authority to use the dedicated apparatus.

7. The information processing apparatus according to claim 6,
wherein after the authority to enter the room is cancelled, the processor grants the first user the authority to enter the room when the first user posts information related to a request for entering the room to the dedicated apparatus on the SNS and a trust relationship between the first user and the dedicated apparatus exists.

8. The information processing apparatus according to claim 1,
wherein the processor also grants the first user an authority to enter a room in which the apparatus is installed when the processor grants the first user the authority to use the dedicated apparatus.

9. The information processing apparatus according to claim 8,
wherein after the authority to enter the room is cancelled, the processor grants the first user the authority to enter the room when the first user posts information related to a request for entering the room to the dedicated apparatus on the SNS and a trust relationship between the first user and the dedicated apparatus exists.

10. The information processing apparatus according to claim 1,
wherein the processor also grants the first user an authority to enter a room in which the apparatus is installed when the processor grants the first user the authority to use the dedicated apparatus.

11. The information processing apparatus according to claim 10,
wherein after the authority to enter the room is cancelled, the processor grants the first user the authority to enter the room when the first user posts information related to a request for entering the room to the dedicated apparatus on the SNS and a trust relationship between the first user and the dedicated apparatus exists.

12. The information processing apparatus according to claim 1,
wherein the dedicated apparatus is a multifunction apparatus having at least one of scan, print, copy and facsimile functions.

13. The information processing apparatus according to claim 1, wherein after receiving the request, the processor is configured to automatically determine both whether the first user has the established trust relationship with the second user and also whether the second user has the established trust relationship with the dedicated apparatus.

14. An information processing system comprising
an information processing apparatus and a dedicated apparatus,
the information processing apparatus providing a social networking service (SNS) in which participants exchange information,
the information processing apparatus including a first processor configured to,
receive a request for authorization to use a dedicated apparatus from a first user, the first user posting the request for authorization on a social networking service (SNS) addressed to the dedicated apparatus; and
determine whether the first user has a trust relationship with a second user and whether the second user has a trust relationship with the dedicated apparatus; and,
the dedicated apparatus including a second processor configured to grant the first user authorization to use the dedicated apparatus when the determination is that the first user has a trust relationship with the second user and the second user has a trust relationship with the dedicated apparatus,
wherein the second processor grants the first user the authority to use the dedicated apparatus when, on the SNS, the first user requests use of the dedicated apparatus, and the second user approves the use,
wherein the first processor is configured to receive information related to a request for creation of a trust relationship between the first user and the dedicated apparatus when the user posts information on the SNS, and create the trust relationship between the first user and the apparatus when the second user approves the creation of the trust relationship between the first user and the dedicated apparatus, and
wherein the second processor grants the first user the authority to use the dedicated apparatus when the first user posts information related to a request for use of the dedicated apparatus to the dedicated apparatus on the SNS after the trust relationship between the first user and the apparatus is created.

15. A non-transitory computer readable medium storing a program causing a computer to execute a process, the process comprising:
receiving a request for authorization to use a dedicated apparatus from a first user, the first user posting the request for authorization on a social networking service (SNS) addressed to the dedicated apparatus;
determining whether the first user has a trust relationship with a second user and whether the second user has a trust relationship with the dedicated apparatus; and
granting the first user authorization to use the dedicated apparatus when the determination is that the first user has a trust relationship with the second user and the second user has a trust relationship with the dedicated apparatus,
wherein the granting including granting the first user the authority to use the dedicated apparatus when, on the SNS, the first user requests use of the dedicated apparatus, and the second user approves the use,
wherein a trust relationship between the first user and the dedicated apparatus is created when the first user posts, information related to a request for creation of the trust relationship between the first user and the dedicated apparatus, and the second user approves the creation of the trust relationship between the user and the dedicated apparatus, and
wherein the granting includes granting the first user the authority to use the dedicated apparatus when the first user posts information related to a request for use of the dedicated apparatus to the dedicated apparatus on the SNS after the trust relationship between the first user and the apparatus is created.

* * * * *